(12) United States Patent
Raghavan et al.

(10) Patent No.: US 7,433,808 B1
(45) Date of Patent: *Oct. 7, 2008

(54) EVENT-BASED TEMPORAL LOGIC

(75) Inventors: Vijay Raghavan, Framingham, MA (US); Ebrahim Mehran Mestchian, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 138 days.

This patent is subject to a terminal disclaimer.

(21) Appl. No.: 11/329,588

(22) Filed: Jan. 10, 2006

Related U.S. Application Data

(63) Continuation of application No. 09/847,391, filed on May 2, 2001, now Pat. No. 7,020,850.

(51) Int. Cl.
*G06F 17/10* (2006.01)
*G06F 17/50* (2006.01)

(52) U.S. Cl. .................... 703/2; 703/14; 703/15; 716/1; 716/18

(58) Field of Classification Search .......... 703/2, 703/13–15, 23; 716/1, 18
See application file for complete search history.

(56) References Cited

U.S. PATENT DOCUMENTS

| | | | |
|---|---|---|---|
| 5,956,741 A | 9/1999 | Jones et al. | |
| 5,966,516 A * | 10/1999 | De Palma et al. | 703/1 |
| 6,195,627 B1 * | 2/2001 | Bargh et al. | 703/14 |
| 6,581,191 B1 | 6/2003 | Schubert et al. | |
| 6,618,839 B1 | 9/2003 | Beardslee et al. | |
| 7,020,850 B2 * | 3/2006 | Raghavan et al. | 716/1 |

OTHER PUBLICATIONS

Ostroff, "A Visual Toolset for the Design of Real-Time Discrete-Event Systems", IEEE Transactions on Control Systems Technology, May 1997, vol. 5, Issue: 3, pp. 320-337.*

"Stateflow User's Guide, Version 2", The MathWorks, Inc., Jan. 1999.*

Kalita et al., "SF2STeP: A CAD Tool for Formal Verification of Timed Stateflow Diagrams", IEEE International Symposium on Computer-Aided Control System Design, CACSD 2000, Sep. 2000, pp. 156-162.*

Drusinsky, Doron, "Specification IS Verification," Time-Rover Presentation.

Drusinksy-Yoresh, Doron, "Specification-based Verification of Reactive Systems," Time-Rover, Disclosure.

(Continued)

*Primary Examiner*—Kamin Shah
*Assistant Examiner*—Herng-der Day
(74) *Attorney, Agent, or Firm*—Lahive & Cockfield, LLP; Kevin J. Canning

(57) ABSTRACT

In an embodiment, a computer-implemented method for modeling a system using a finite state machine representation is presented. An event-driven temporal logic operator may be associated with a first, active state in the finite state machine representation. A value of the temporal logic operator may be determined by a number of occurrences of an event during an existing activation of the first state associated with the temporal logic operator. A state transition from the first state to a second state may be executed based on the value of the temporal logic operator. The second state may be set as the active state.

19 Claims, 22 Drawing Sheets

OTHER PUBLICATIONS

Harel, David, "Executable Object Modeling with Statecharts," *IEEE Computer*, vol. 30(7):31-42 (1997).

Harel, D. et al., "On the Formal Semantics of Statecharts," Proceedings of the Symposium on Logic in Computer Science, pp. 54-64 (1987).

Harel, David, "On Visual Formalisms," *Communications of the ACM*, vol. 31 (5):514-530 (1988).

Harel, David, "Statecharts: A Visual Formalism for Complex Systems," *Science of Computer Programming*, vol. 8:231-274 (1987).

Henzinger, Thomas A. et al., "Temporal Proof Methodologies for Real-time Systems," *Proceedings of the 18th ACM SIGPLAN-SIGACT Symposium on Principles of Programming Languages*, pp. 353-366 (1991).

Kang, Kyo C. et al., "Parts: A Temporal Logic-Based Real-Time Software Specification and Verification Method," *Department of Computer Science and Engineering, Pohang University of Science and Technology, ICSE*, pp. 169-175 (1995).

Manna, Zohar et al., "Models of Concurrency," The Temporal Logic of Reactive and Concurrent Systems, Specifications, Springer-Verlag (1991).

Time-Rover, "Temporal Logic: Time is of the Essence," retrieved online at http://www.time-rover.com/ltl/html (1999).

Tuzhilin, Alexander, "Extending Temporal Logic to Support High-Level Simulations," ACM Transactions on Modeling and Computer Simulations, vol. 5(2):129-155 (1995).

\* cited by examiner

```
/*
 *
 *
 * Stateflow code generation for chart:
 *     temporal_example/Chart
 *
 * Target Name              : target
 * Model Version            : 1.188
 * Stateflow Version        : 4.0.3.12.00.1.000000
 * Date of code generation  : 26-Mar-2001 12:31:13
 *
 */ ifndef __chart_h__
define __chart_h__
typedef struct SFchartCounterStruct {
    unsigned int il : 4;
} SFchartCounterStruct;                          } 1800
typedef struct SFchartStateStruct {
    unsigned int is_active_chart : 1;
    unsigned int is_chart : 2;
} SFchartStateStruct;                            } 1820
typedef struct SFchart_InstanceStruct {

SFchartCounterStruct Counters;
    SFchartStateStruct State;
} SFchartInstanceStruct;                         } 1830 void chart (void);                  } 1840

/* Input events: */
void broadcast_chart_CLK(void);
#endif                              } 1810
```

FIG. 18

```
*     temporal_example/Chart
*
* Target Name               : target
* Model Version             : 1.188
* Stateflow Version         : 4.0.3.12.00.1.000000
* Date of code generation   : 26-Mar-2001 12:31:13
*
*/ include "temporal_example_target.h"
include "chart.h"

#define IN_NO_ACTIVE_CHILD        (0)
#define IN_cl_s1_A                1
#define IN_cl_s2_B                2
#define IN_cl_s3_C                3
#define event_CLK                 0
static SFchartInstanceStruct    chartInstance;
void chart(void);

void chart(void)                                            }1910
{

{
    /* During: Chart */
    if(_sfEvent_temporal_example_ == event_CLK) {     ⎫
      if(chartInstance.Counters.i1<0xfU) {             ⎬1920
        chartInstance.Counters.i1++;                   ⎭
      }
    }
    if (chartInstance.State.is_active_chart ==0)  ⎫
      /* Entry: Chart */                          ⎪
      chartInstance.State.is_active_chart ==1;    ⎬1930
      /* Entry: A */                              ⎪
      chartInstance.State.is_chart = IN_cl_s1_A;  ⎪
      chartInstance.Counters.i1=0;                ⎭
    } else {
1940{  switch(chartInstance.State.is_chart)  {
```

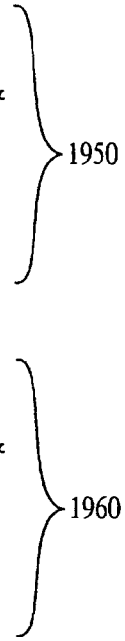

```
case IN_cl_s1_A:
 /* During: A */
 if((_sfEvent_temporal_example_ == event_CLK) &&
   (chartInstance.Counters.i1 >= 3)) {
    /* Exit: A */
    /* Entry: B */
    chartInstance.State.is_chart = IN_cl_s2_B;
    chartInstance.Counters.i1=0;
 }
 break;
case IN_cl_s2_B:
 /* During: B */
 if((_sfEvent_temporal_example_ == event_CLK) &&
   (chartInstance.Counters.i1 >= 10)) {
    /* Exit: B */
    /* Entry: C */
     chartInstance.State.is_chart = IN_cl_s3_C;
     chartInstance.Counters.i1=0;
 }
```

EVENT-BASED TEMPORAL LOGIC

RELATED APPLICATIONS

This application is a continuation application of U.S. patent application Ser. No. 09/847,391, filed May 2, 2001, entitled "Event-Based Temporal Logic".

COPYRIGHT NOTICE

A portion of the disclosure of this document contains material that is subject to copyright protection. The copyright owner has no objection to the facsimile reproduction by anyone of the patent document or the patent disclosure, as it appears in the Patent and Trademark Office patent file or records, but otherwise reserves all copyright works whatsoever.

TECHNICAL FIELD

This invention relates to finite state machine emulation systems, and more particularly to the emulation of finite state machines defined in terms of temporal conditions.

BACKGROUND

It is often useful to describe the behavior of a system having discrete states (such as a digital computer) in terms of a finite state machine model. A finite state machine model is described in terms of "states," "transactions," and "events." At any given time, one or more of the states of the machine is said to be "active." Actions within the model are triggered in response to the occurrence of "events" which are defined by the model. When an event occurs, it may trigger an action associated with a particular state, or it may trigger a change in state. State changes in response to events are determined by a set of defined "transitions," which indicate that a change from one state to another should occur in response to an event when particular conditions are true. Such models are therefore said to be "event-based".

One well-known formalism for representing finite state machines is called "statecharts." See D. Harel, "Statecharts: A Visual Formalism for Complex Systems," *Sci. Computer Prog.*, July 1987, pp. 231-274. In a statechart, a finite state machine is graphically represented as a connected graph having a set of nodes, representing states, connected by directed edges, representing transitions. The existence of an edge going from a first node to a second node in a statechart indicates that a transition may occur between the respective states represented by the two nodes when conditions associated with the edge are met.

A variant of the statechart formalism is used in connection with the Stateflow® programming system developed by and available from The Mathworks, Inc., Natick, Mass. The Stateflow® modeling system permits a user to input a statechart-like diagram describing a finite state machine using a graphical user interface. The diagram is then converted by the Stateflow® system into source code in a procedural programming language such as C.

Referring now to FIG. 1, an example of a finite state machine 100 in a Stateflow® diagram is shown. States 105 include labels 110, followed by a sequence of statements in the Stateflow® action language. These statements describe actions that may be performed by the finite state machine when an event occurs. The statements may include "entry actions" 120, "during actions" 130, and "exit actions" 140. During emulation of finite state machine 100, "entry action" 120 is performed each time state 105a becomes active, "during action" 130 is performed whenever an event occurs and state 105a is active, and "exit action" 140 is performed whenever state 105b becomes inactive. One type of "during action" is a "conditional action" 150 (specified by the prefix "on"). "Conditional action" 150 includes a conditional expression 160 followed by a ":" followed by an action statement 170. Action 170 of conditional action 150 is performed whenever an event occurs, state 105a is active, and conditional expression 160 is true. (Here conditional expression 160 is the name of an event, "power_outage", which is true whenever that event has just occurred).

Referring now to FIG. 2, a generic example of a transition definition 200 connecting two states 205 and 210. in a Stateflow® diagram is shown. The transition may include a conditional expression 215, optionally followed by a condition action 220, and/or a transition action 230. Whenever an event occurs and state 205 is active, the conditional expression 215 is evaluated. If it is true the condition action 220 is performed. Then state 205 is made inactive, transition action 230 is performed, and state 210 is made active. Here, conditional expression 215 is "E[off_count0]" which is true when event E has occurred and the variable off count equals zero. It is followed by a condition action 220 "off_count+" which results in incrementing the variable off count by one. The tansition action 230 "Light_off" indicates that a Light_off event should be broadcast when the transition is complete.

States in a Stateflow® diagram may include substates. A state that includes substates is said to be a superstate of those substates. A substate may only be active when its superstate is also active. Two types of superstates may be specified by a user in a Stateflow® diagram. In an "exclusive or" superstate only one of its substates may be active at any given time. In a "parallel" superstate, more than one substate may be active at the same time.

When the Stateflow®D modeling system generates code for emulating the finite state machine in a diagram, it generates, for each state in the diagram, code for performing the state's entry, during, and exit actions, as well as logic for executing these code fragments at appropriate times according to the semantics of the state diagram. For each transition in the diagram, the system generates code for testing the condition associated with the transition and for performing appropriate actions associated with the transition if the condition is true. These actions include calling the exit actions procedure for the state being exited, and the entry actions procedure for the state being entered.

In creating finite state machine models, it is often useful to condition a particular transition or action statement on the number of times that an event has occurred since the system entered a particular state. For example, it may be useful to transition from a first state to a second state on the condition that a particular event has occurred five times since the first state became active. We refer to such conditions as "temporal conditions."

In prior art systems, it was possible for a user to describe a finite state machine having temporal conditions by explicitly setting up a counter variable and including explicit action statements in a particular state to initialize, increment and test the counter variable whenever a particular event occurred. However such techniques were error prone and resulted in inelegant and awkward block diagram descriptions.

SUMMARY

Accordingly, it is an object of the present invention to provide a temporal logic operator in a finite state machine description language for describing temporal conditions in a finite state machine. In particular, the present invention provides a system and method for modeling finite state machines in which a temporal condition can be described directly, using a temporal logic operator.

In general, in one aspect, the invention provides a computer system and method including receiving in the system a description of a finite state machine model, the model comprising at least two state definitions and at least one definition of a transition between the states, receiving as part of the description of the finite state machine model a conditional expression associated with a first state of the finite state machine model, the conditional expression comprising a first temporal logic condition defined by a first temporal logic operator operating on an event, the conditional expression defining a logical condition for taking a first action specified in the model, and generating code for emulating the finite state machine model, including code for evaluating the conditional expression during emulation.

In general, in another aspect, the invention provides a computer system and method including receiving in the system a description of a finite state machine model, the model comprising at least two state definitions and at least one definition of a transition between states, receiving as part of the description of the finite state machine model a conditional expression associated with a first state of the finite state machine model, the conditional expression comprising a first temporal logic condition defined by a first temporal logic operator operating on an event, the conditional expression defining a logical condition for taking a first action specified in the model, and emulating the finite state machine model.

In general, in another aspect, the invention provides computer programming system having a central processing unit, a mass storage subsystem, a program editor capable of receiving from a user a description of a finite state machine including a temporal logic condition and storing the description on the mass storage subsystem, and a code generator capable of receiving the stored description and generating code for emulating the described finite state machine.

In general, in another aspect, the invention provides a computer programming system having a central processing unit, a mass storage subsystem, a program editor capable of receiving from a user a description of a finite state machine including a temporal logic condition and storing the description on the mass storage subsystem, and an emulator capable of receiving the stored description and emulating the described finite state machine.

In general, in another aspect, the invention provides a method for operating a computer system including receiving from a user a description of a finite state machine including a temporal logic condition and storing the description on the mass storage subsystem and generating code for emulating the described finite state machine.

In general, in another aspect, the invention provides a method for operating a computer system including receiving from a user a description of a finite state machine including a temporal logic condition and storing the description on the mass storage subsystem and emulating the described finite state machine.

Embodiments of the invention may have one or more of the following features. Generating code for the conditional expression includes generating code for declaring a counter variable that is not otherwise specified in the description of the finite state machine model, generating code for initializing the counter variable upon entry into the first state, generating code for incrementing the counter variable when the first event occurs, generating code for performing a first test associated with the first temporal logic operator on the counter variable when the first state is active, and generating code for taking a first specified action based on the result of said first test. The conditional expression is part of a conditional action expression in the definition of the first state, and the first specified action is defined in the conditional action expression. The conditional expression is part of the definition of a transition from said first state to a second state and wherein said first specified action is defined by said transition. The description of the finite state machine model includes a second conditional expression associated with a second state of the finite state machine model, the second conditional expression including a second temporal logic condition defined by a second temporal logic operator operating on the event, the second conditional expression defining a logical condition for taking a second action specified in the model and generating code for emulating the finite state machine model includes generating code for initializing the counter variable upon entry into the second state, generating code for performing a second test associated with the second temporal logic operator on the counter variable when the second state is active, and generating code for taking a second specified action based on the result of the second test. The description of a finite state machine model is a graphical description. The first temporal logic operator operates on an event E and a threshold T and is true when the event E has occurred at least T times during the current activation of the first state. The first temporal logic operator operates on an event E and a threshold T and is true when the event E has occurred at less than T times during the current activation of the first state. The first temporal logic operator operates on an event E and a threshold T and is true when the event E has occurred exactly T times during the current activation of the first state. The first temporal logic operator operates on an event E and a threshold T and is true when the event E has occurred a positive integral multiple of T times during the current activation of the first state. The graphical representation is a Stateflow® diagram. The conditional expression is part of a conditional action expression which is graphically represented as a textual expression within a node representing a state of the finite state machine model. The conditional expression is part of the definition of a transition from the first state to a second state and the conditional expression is graphically represented as a textual expression that is proximate to a line connecting nodes representing the first and second states. The generated code is source code in human readable form.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 18 shows a header file for a C program.

Like reference symbols in the various drawings indicate like elements.

DETAILED DESCRIPTION

In a preferred embodiment, the present invention provides a system and method for implementing temporal logic operators in the Stateflow® action language. The invention is not limited to use with Stateflow® diagrams and, as will be apparent to those of skill in the art, temporal logic operators according to the invention may be used in connection with a wide variety of systems for describing and emulating finite state machines.

We define a new type of operator for use in, e.g., the Stateflow® action language, called a temporal logic operator. A temporal logic operator is a type of Boolean function that may be used in a conditional expression associated with a state (including a transition leading from the state). A temporal logic operator has at least one parameter: an event E. The operator may also have others parameters, such as a threshold value. The value of the temporal logic operator at a given time is determined by the number occurrences of event E during the current activation of the state with which it is associated.

In a preferred embodiment of the invention, there are four temporal logic. operators: after (T, E), before (T, E), at (T, E), and every (T, E). In each case, the parameter E is an event defined in the state diagram, and the parameter T is a numerical expression representing a threshold value. The after operator is defined to be true if and only if event E has occurred at least T times during the current activation of state A. The before operator is defined to be true if and only if event E has occurred less than T times during the current activation of state A. The at operator is defined to be true if and only if event E has occurred exactly T times during the current activation of state A. The every operator is defined to be true at every Tth—occurrence of event E during the current activation of state A. A full description of the valid notations and semantics of Stateflow® state diagrams is attached hereto as Appendix A.

Figure 1:
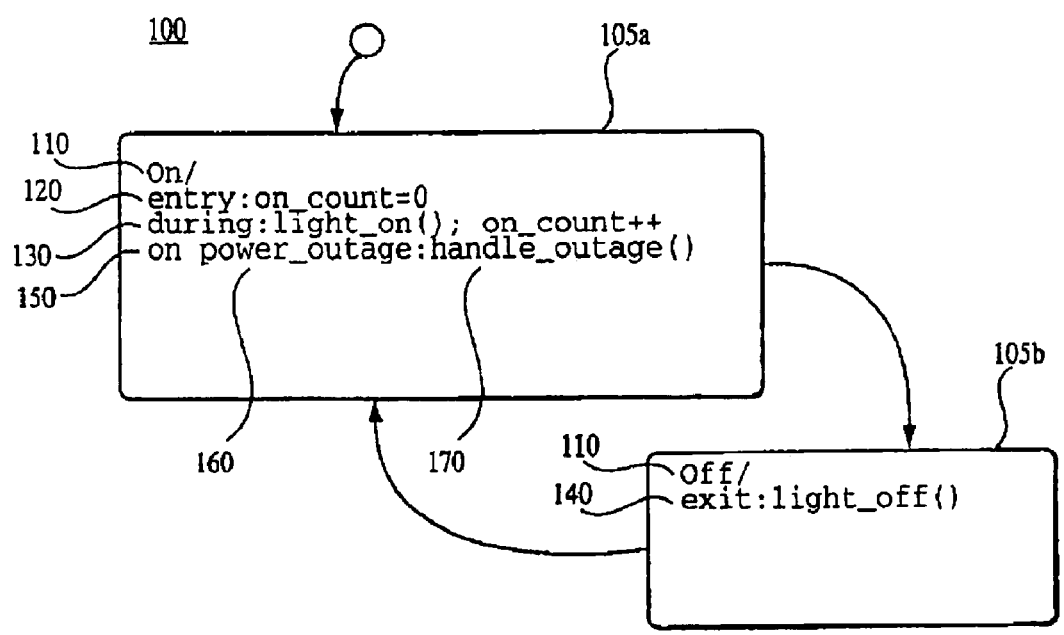
FIG. 1 shows a Stateflow® diagram
Figure 2:
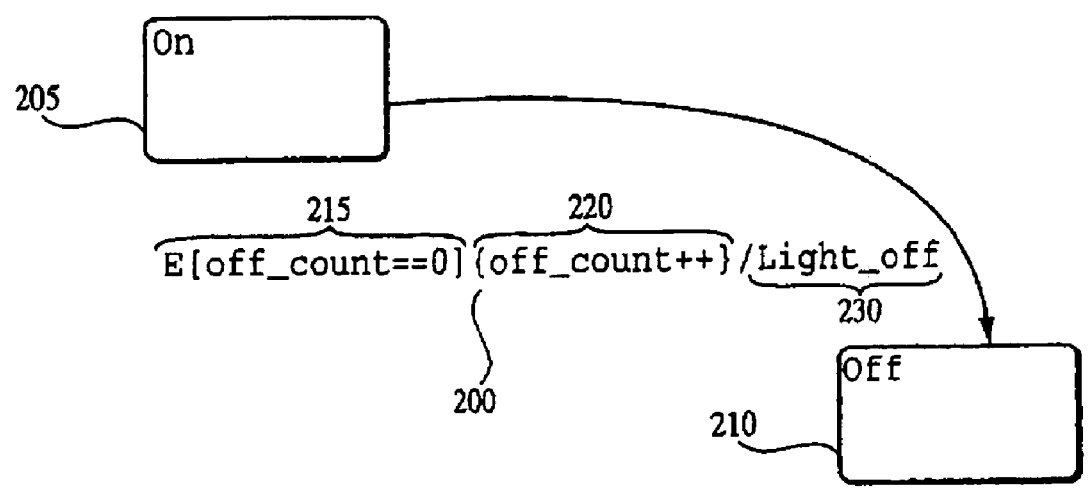
FIG. 2 shows a Stateflow® diagram
Figure 3:
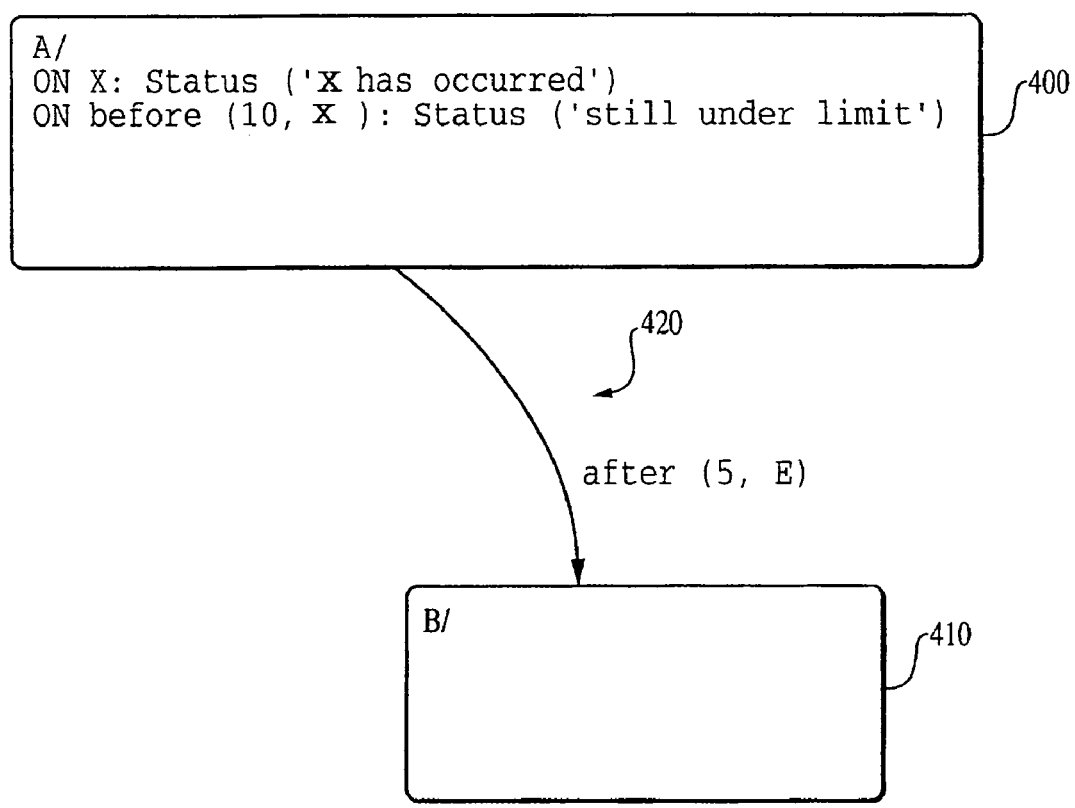
FIG. 3 shows a Stateflow® diagram including temporal logic conditions.

FIG. 3 shows a Stateflow® diagram incorporating temporal logic operators according to the present invention. (A Stateflow® diagram may also be referred to herein as a "chart"). In the Stateflow® diagram of FIG. 3, there are two states A 400 and B 410. State A includes a conditional action statements "on X: status('X has occurred')" and "on before (10, X): status('still under limit')." These statements indicate that when event X occurs while state A. is active, a status message "X has occurred" will be generated. In addition, if X has occurred less than ten times since A became active, a further status message "still under limit" will also be generated.

FIG. 3 also shows a transition 420 between state A and state B, which has the condition "after(5, E)". This condition indicates that the transition will be triggered after five occurrences of the event E after state A has become active. As can be seen, the use of temporal logic operators such as "before" and "after" permits a user to specify a temporal condition without the need for the user to define, maintain or test a counting variable associated with the condition.

Figure 4:
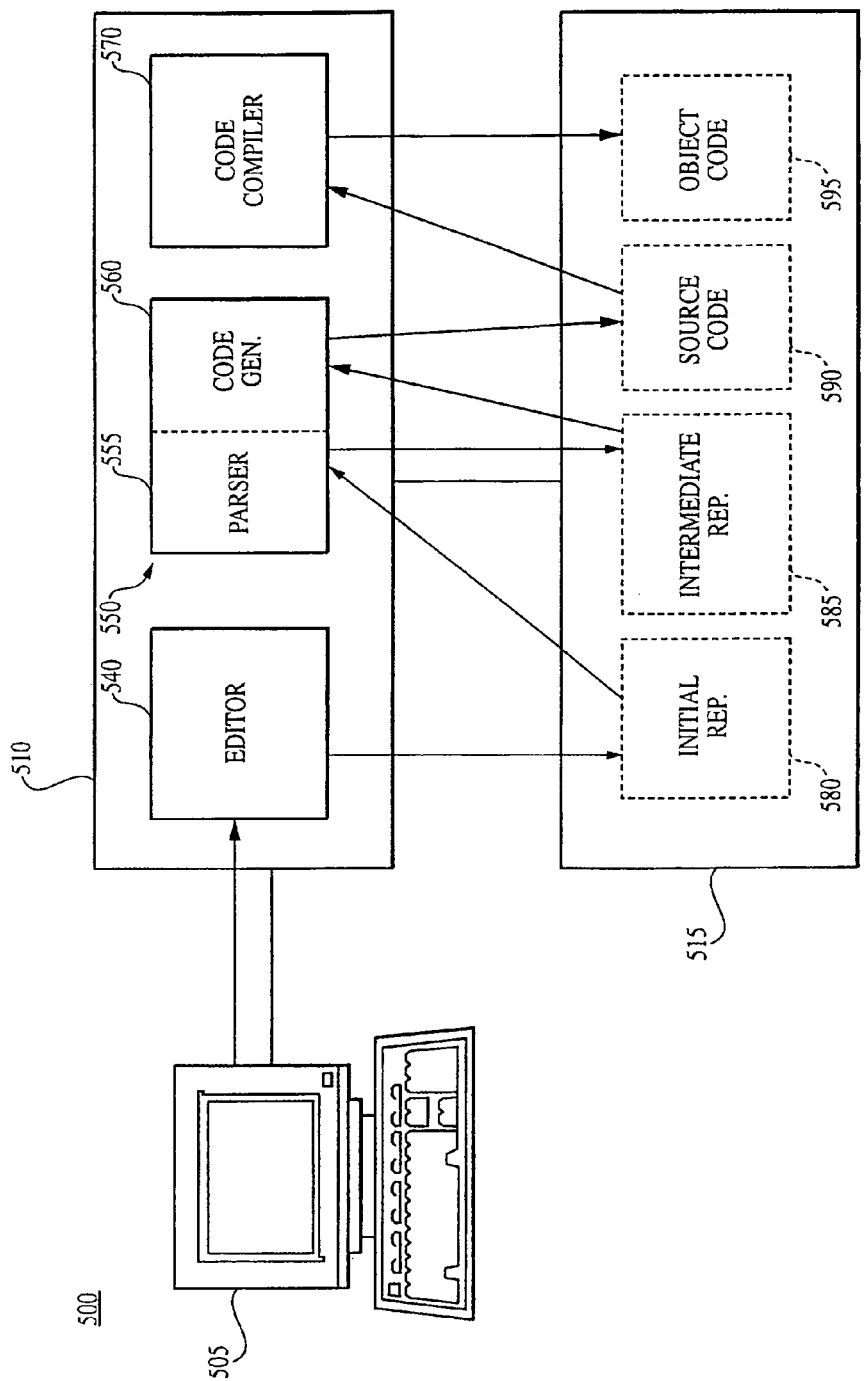
FIG. 4 shows a computer system.

FIG. 4 represents a high level overview of the flow of information through a programming system 500 on which a particular embodiment of the present invention may be implemented. A computer display 505 capable of providing a graphical user interface is connected to a programmed computer 510. Programmed computer 510 is connected to a mass storage system 515 and is capable of running a state diagram editor 540, a state diagram compiler 550 and a source code compiler 570. Using the state diagram editor 540, the user enters a diagram into the system through the graphical user interface. State diagram editor 540 creates an initial representation 580 of the diagram and stores the representation on mass storage system 515. The initial representation of the diagram is a set of data structures containing sufficient information to describe the graphical appearance of the diagram entered by the user.

The state diagram compiler 550 is composed of a parser 555 and a code generator 560. When the user invokes the state diagram compiler 550, the parser reads the initial representation 580 from mass storage system 515 and parses it into an optimized intermediate representation 585 of the diagram. The intermediate representation 585 of the diagram includes linked lists of data objects corresponding to programming constructs (e.g. data structures and procedures) that are needed to emulate the finite state machine described in the diagram using a high level procedural programming language. The code generator 560 then generates source code 590 in a particular high level programming language specified by the user, based on data objects in the intermediate representation. This source code 590 is stored on mass storage system 515, from which it can be read by the source code compiler 570 to generate executable object code 595 therefrom.

Figure 5:
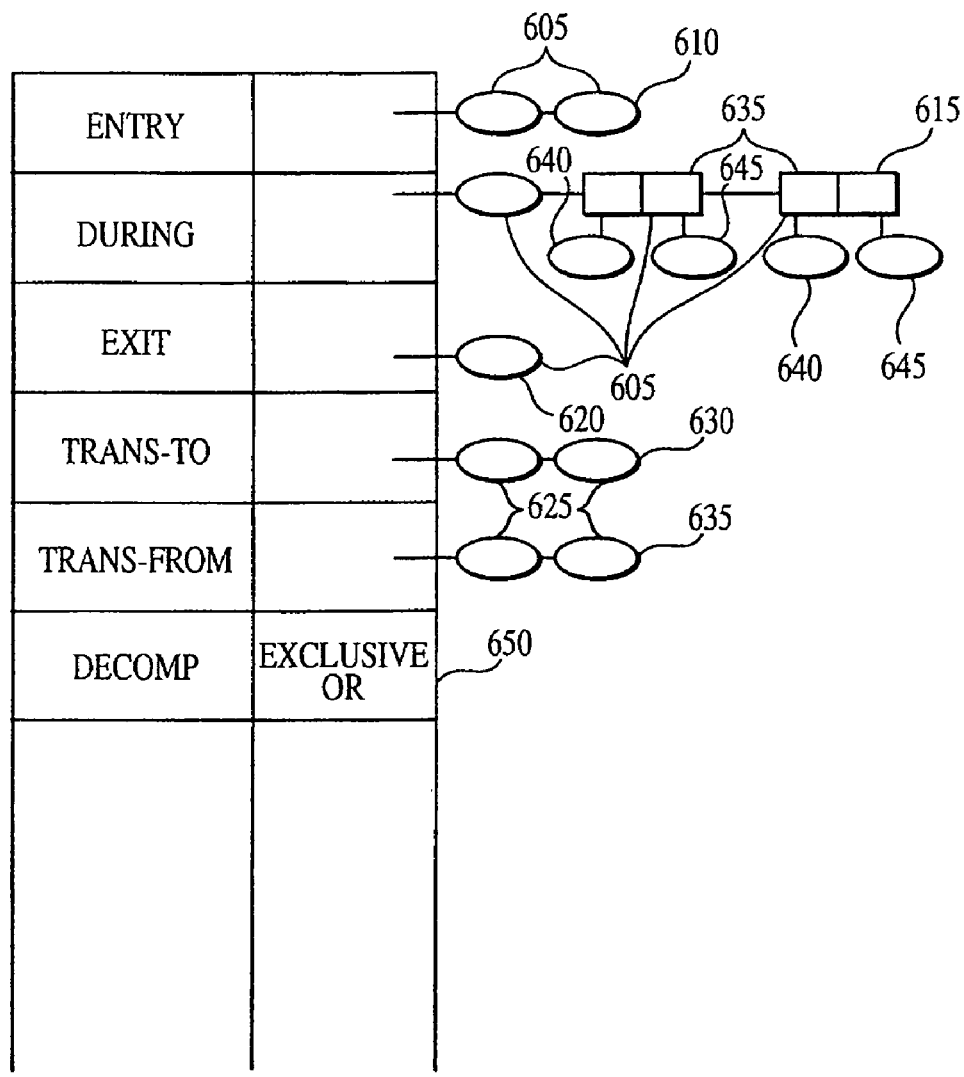
FIG. 5 shows a data structure.

Referring now to FIG. 5, an exemplary intermediate representation of a state is shown. State 600 includes linked lists of action objects 605 representing the action statements contained in the state. Specifically linked lists 610, 615 and 620 correspond to the entry, during, and exit action statements in the state, respectively. State 600 also includes two linked lists of transition objects 625 representing transitions to (630) and from (635) the state. The intermediate representation also includes an attribute 650 indicating whether the state has exclusive-or or parallel decomposition of substates. One type of action object is a conditional action object 635 which comprises two parts, a condition object 640, and a further action object 645.

Figure 6:
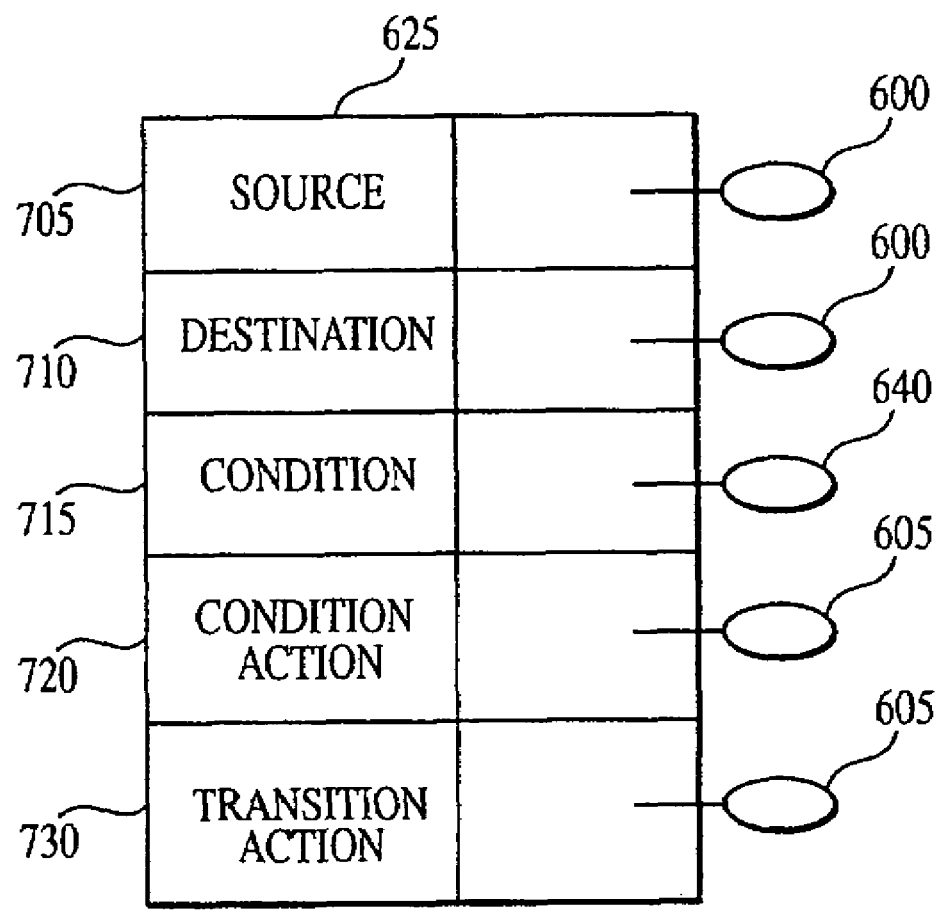
FIG. 6 shows a data structure.

Referring now to FIG. 6, a transition object 625 includes links to its "source" state (705), its "destination" state (710), a pointer 715 to a condition object 640, an action object 605 representing the condition action 720 and an action object representing the transition action 730 associated with the transition represented by transition object 625.

Figure 7:
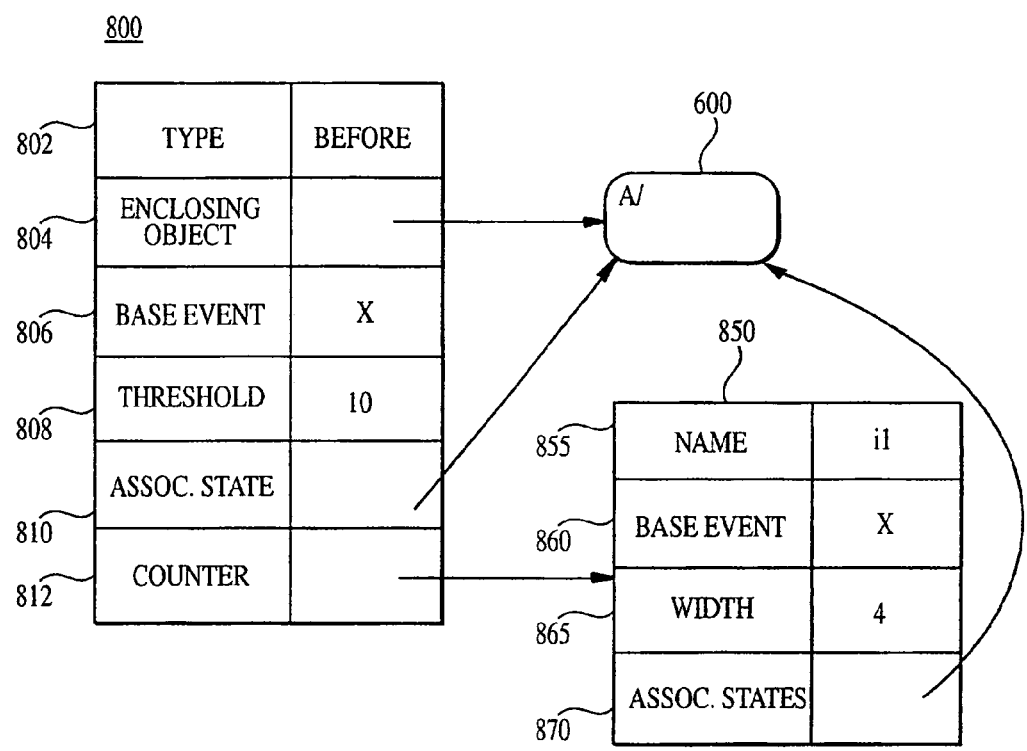
FIG. 7 shows a data structure.

We define a "temporal logic condition" to be a condition defined in terms of a temporal logic operator. When the parser parses a temporal logic condition (in either a conditional action or a transition), it creates a particular type of condition object called a TLCondition object. Referring now to FIG. 7, a TLCondition object 800 representing the "before" condition in FIG. 3 is shown. It includes a type 802 (e.g., before, after every, or at), an object pointer 804 back to its enclosing object (i.e., the state or transition in which the operator occurs), a base event 806, a threshold 808, an associated state 810, and a pointer 812 to a TLCounter object 850, representing a counter variable.

Referring still to FIG. 7, TLCounter object 850 includes a unique counter name 855, a base event 860, a counter width 865, and a linked list 870 of associated states.

TLCondition objects and TLCounter objects generated by the parser are also linked together in respective master linked lists so that they may be systematically searched during the compilation process.

Figure 8:
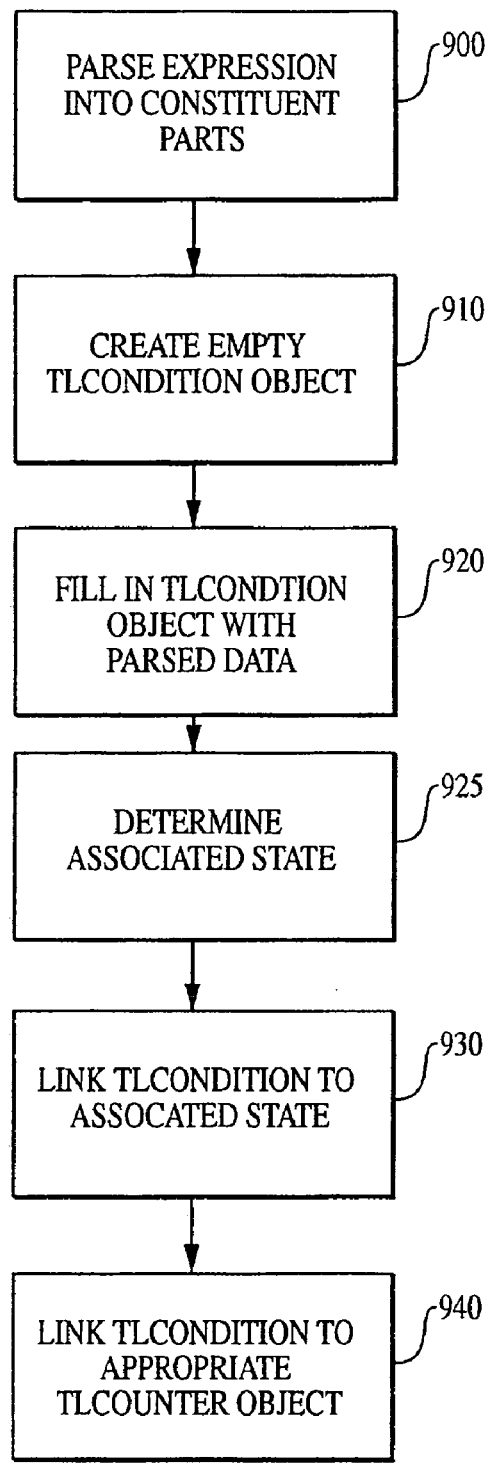
FIGS. 8-16 show flow charts.

Referring now to FIG. 8, the following steps are taken by the parser when the parser parses a temporal logic condition. First, the parser parses the expression into its constituent parts: type (before, after, every, at), base event, and threshold (step 900). It then proceeds to create a new TLCondition object for the condition. It first creates an empty condition data structure and links this to the end of the master TLCondition list (step 910). It then enters the parsed condition data, i.e., type, base event, and threshold information into the appropriate fields in the data structure (step 920). Next it determines the state associated with the condition (step 925) and creates a pointer from the TLCondition object to the associated state (step 930). Finally, the parser links the TLCondition to an appropriate TLCounter object representing a counter variable for the temporal logic condition (step 940).

Figure 9:
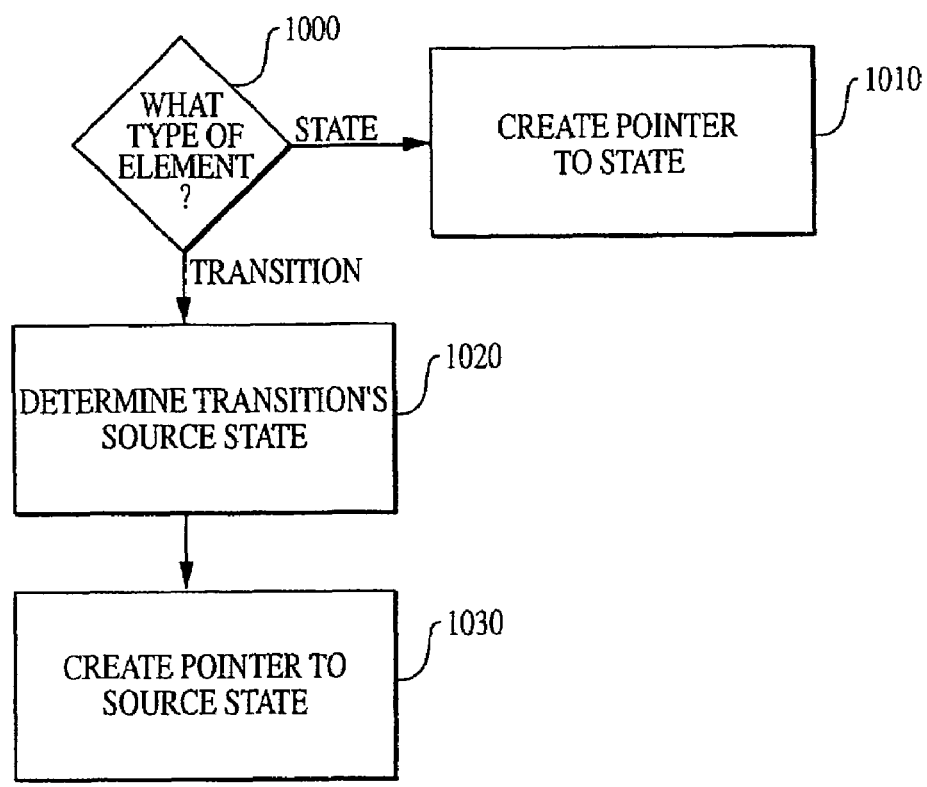

Referring now to FIG. 9, the parser uses the following method for determining the TLCondition's associated state. It first determines the type of element (i.e., a state or a transition) being processed when the temporal logic condition was encountered (step 1000). If the parser was parsing a state element when it encountered the temporal logic condition, it enters a pointer to the state element in the associated state field of the TLCondition data structure (step 1010). If the parser was parsing a transition element when it encountered the temporal logic condition, it gets a pointer to the transition's source state from the transition data structure (step 1020) and enters that pointer in the associated state field of the TLCondition data structure (step 1030).

Figure 10:
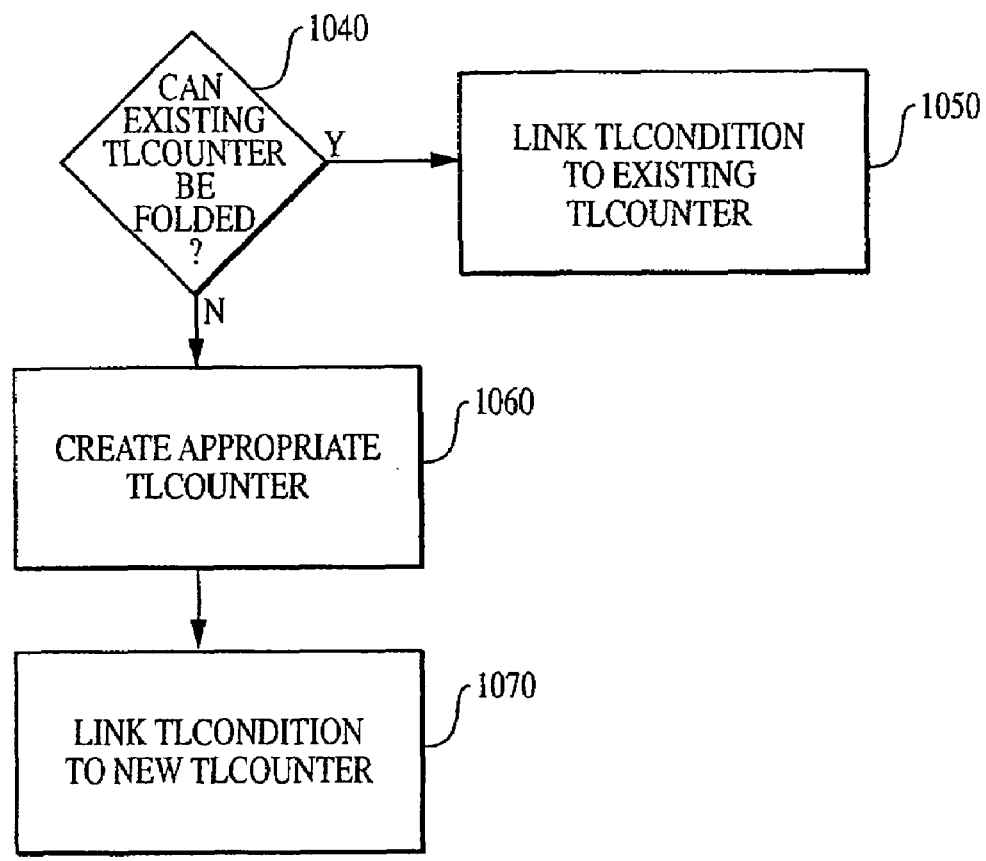

First, referring now to FIG. 10, the parser takes the following steps to link the TLCondition to an appropriate TLCounter. First, the parser checks the TLCounter master list to determine whether it needs to create a new TLCounter for this TLCondition or if it can "fold" (i.e., reuse) an existing TLCounter (step 1040). This process is described in more detail below. If the parser can reuse an existing TLCounter, the parser updates the entry for the current TLCondition to point to the entry for the existing TLCounter (step 1050). If the TLCondition cannot reuse an existing TLCounter, the parser creates a new TLCounter and adds it to the TLCounter master list (step 1060). It then inserts a pointer to the new counter in the entry for the current TLCondition (step 1070). This completes the parsing of the temporal logic condition.

Figure 11:
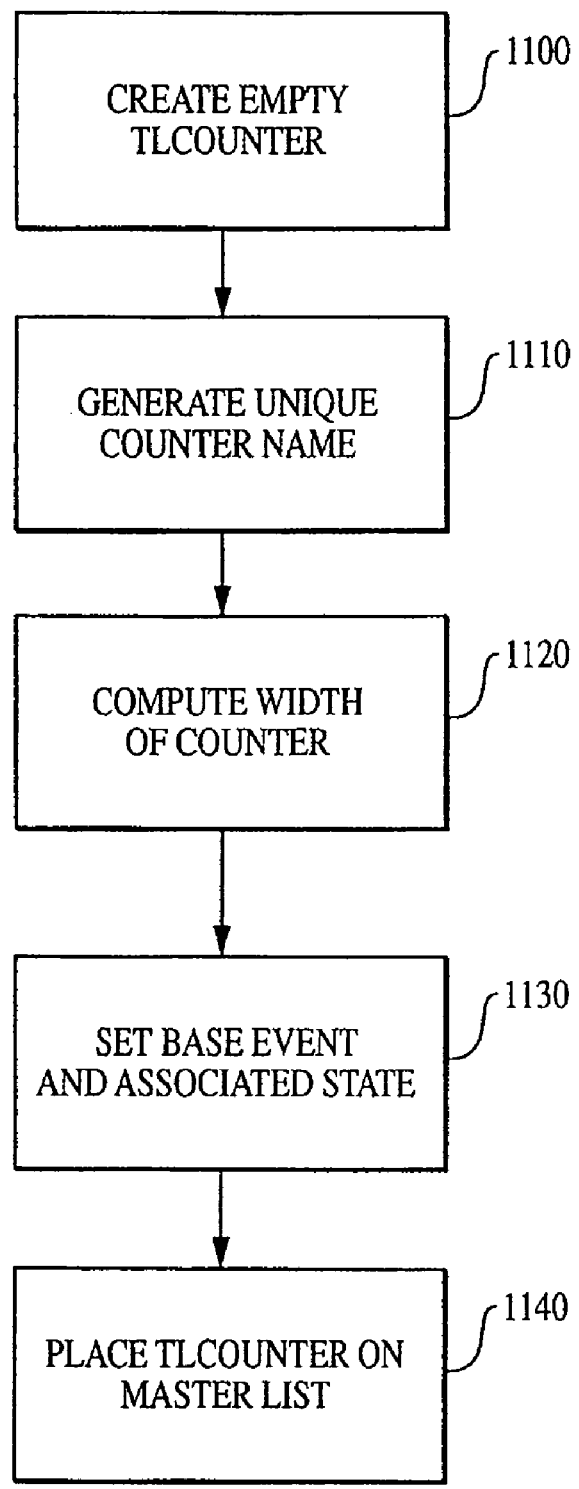

Each TLCounter structure corresponds to a counter variable that will be declared in the source code generated by the code generator 560. Referring now to FIG. 11, the parser takes the following steps to create a TLCounter structure. First, it creates an empty TLCounter data structure (step 1100). The parser then proceeds to fill out the data structure with information needed to generate the variable declaration. First, it generates a unique name for the new counter variable and inserts this in the data structure (step 1110). Next, the parser computes the number of bits required to represent the counter in memory. This is equal to log2(t) where t is the counter threshold value obtained from the TLCondition data structure. The parser inserts this in the width field of the counter data structure (step 1120). Finally, the parser inserts the base event and state associated with the counter in the appropriate fields in the counter data structure (step 1130). This information comes from the entry in the TLCondition list for the TLCondition that this counter is associated with Finally, the parser links the new TLCounter data structure to the end of the TLCounter list (step 1140). This completes creation of a counter.

Figure 12:
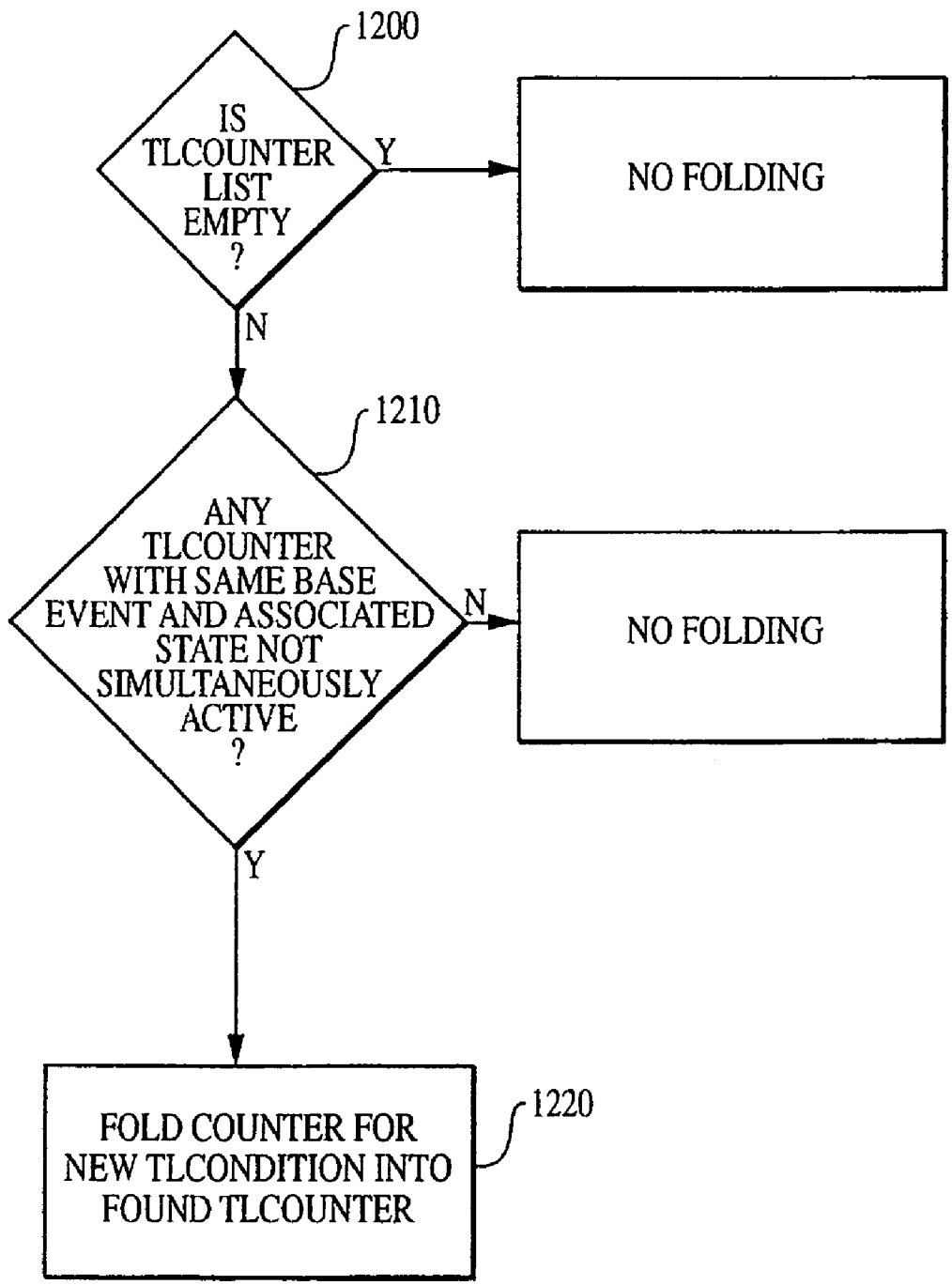

As noted above, the parser may "fold" counter variables by associating the same variable with multiple temporal logic conditions. Referring now to FIG. 12, the parser takes the following steps to determine whether the counter for a new TLCondition structure may be folded into any existing TLCounter structure. First the parser checks whether the TLCounter master list is empty (step 1200). This list lists all the counters created thus far in the parse process. If the list is empty, the TLCondition currently being parsed is the first to be encountered. In this case there are no existing counters and hence no folding can occur. If the TLCounter list is not empty, the parser iterates through the list, searching for a TLCounter whose associated states are never active at the same time as the temporal logic condition currently being parsed and which has the same base event as the TLCondition currently being processed (step 1210). If the parser cannot find a TLCounter that satisfies this condition, no folding can occur. If the parser does find a TLCounter that satisfies the condition, then folding can occur using the found TLCounter (step 1220).

Figure 13:
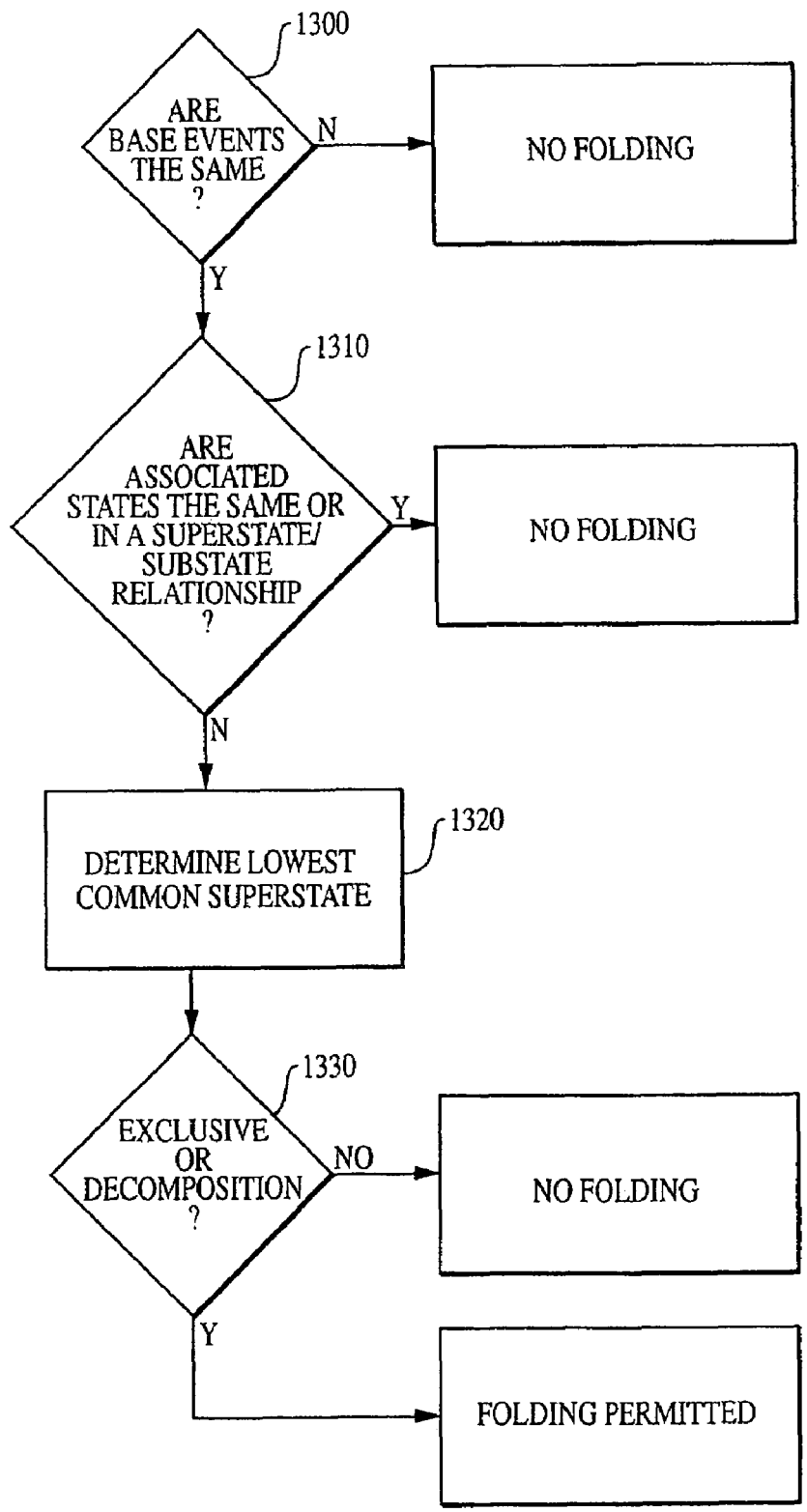

FIG. 13 shows in more detail the steps for determining whether a particular counter for a TLCondition may be folded into a counter represented by a particular TLCounter data structure. First, the base events of the TLCondition and TLCounter are compared (step 1300). If the base events are different, the counter variables may not be folded. Next, it is determined whether the associated states of the TLCondition and the TLCounter are either the same or in a superstate/substate relationship (step 1310). If either condition is true, then the counter variables may not be folded. If the two states are not the same or if they are not in a superstate/substate relationship, then the lowest common superstate of the two associated states is determined (step 1320). The lowest common superstate is smallest superstate that includes both states as a substate. If there is no such superstate, then the state diagram itself is the lowest common superstate. Next, it is determined whether the lowest common superstate has the exclusive-or decomposition attribute (step 1330). If it does not have this attribute, then the variables may not be folded. If it does, then the respective counter variables of the two fragments may be folded.

Figure 14:
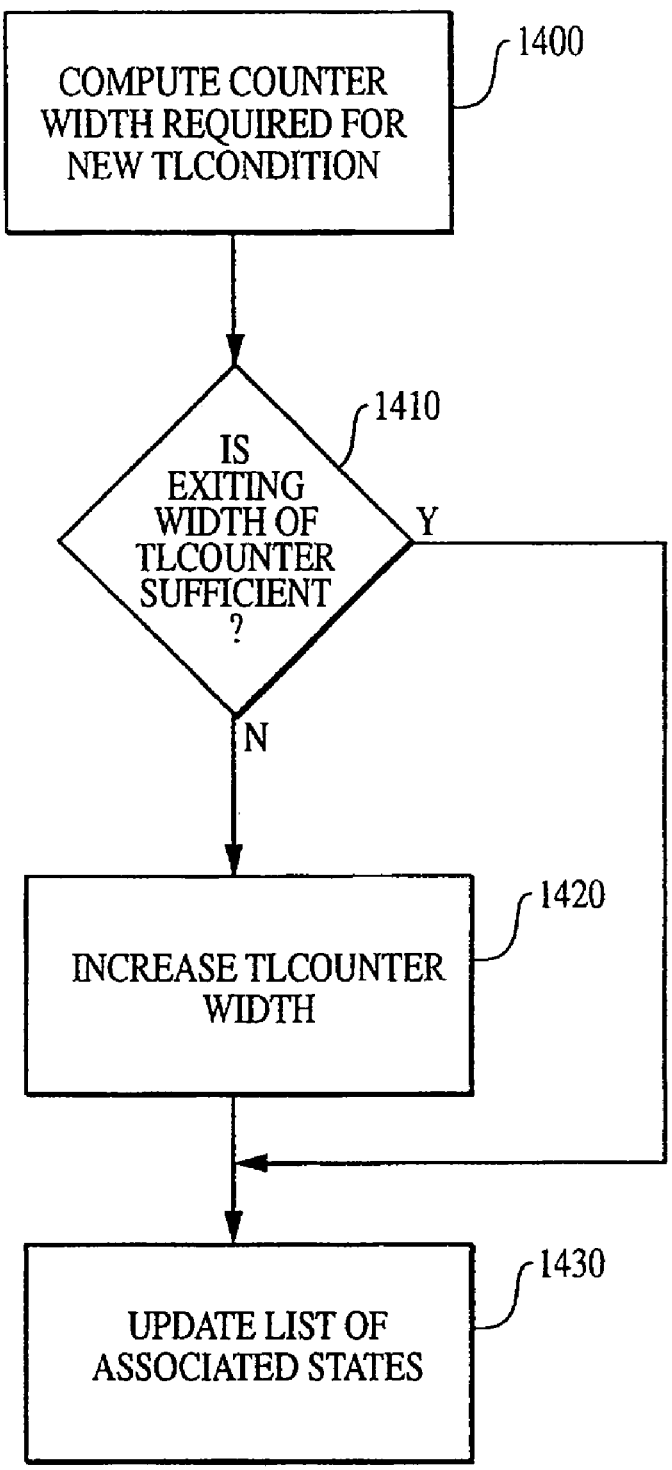

Referring now to FIG. 14, if folding is permitted, the folding process proceeds as follows. First the parser computes the width, log2(t), of the counter required to implement the TLCondition currently being parsed (step 1400). (Here t is the threshold value from the TLCondition data structure, and log2(t) therefore represents the number of bits needed to represent a number as large as t). Next, it compares the computed width with the width of the existing TLCounter (step 1410). If the width of the existing TLCounter is smaller than the required width, the parser increases the width of the existing TLCounter to equal the required width (step 1420). Finally, it updates the existing TLCounter's lists of associated states to include the state associated with the TLCondition currently being parsed (step 1430). This completes the folding process.

In the code generation phase, the code generator generates source code in a high level language that embodies the diagram for which the code is being generated. The generated code consists of a set of functions and global variable declarations (see example below). The set of functions includes a function for the diagram has a whole (called the "chart" function), functions for each state, and functions for broadcasting each event defined by the diagram. The chart function is called whenever one of the broadcast functions is called. These may be called as a result of events defined within the state diagram, or may be the result of external inputs. The event broadcasting function sets a global state variable to the ID for the event and invokes the chart function. The chart function performs any global "during" actions that have been defined and then invokes, in turn, each state function. The state functions perform actions and transition computations associated with the state, based on the specified event. Thus, when a state function is called, it will call subroutines for performing each of the "during" actions associated with the state, and for testing each of the transitions for which the state is a source.

Figure 15:
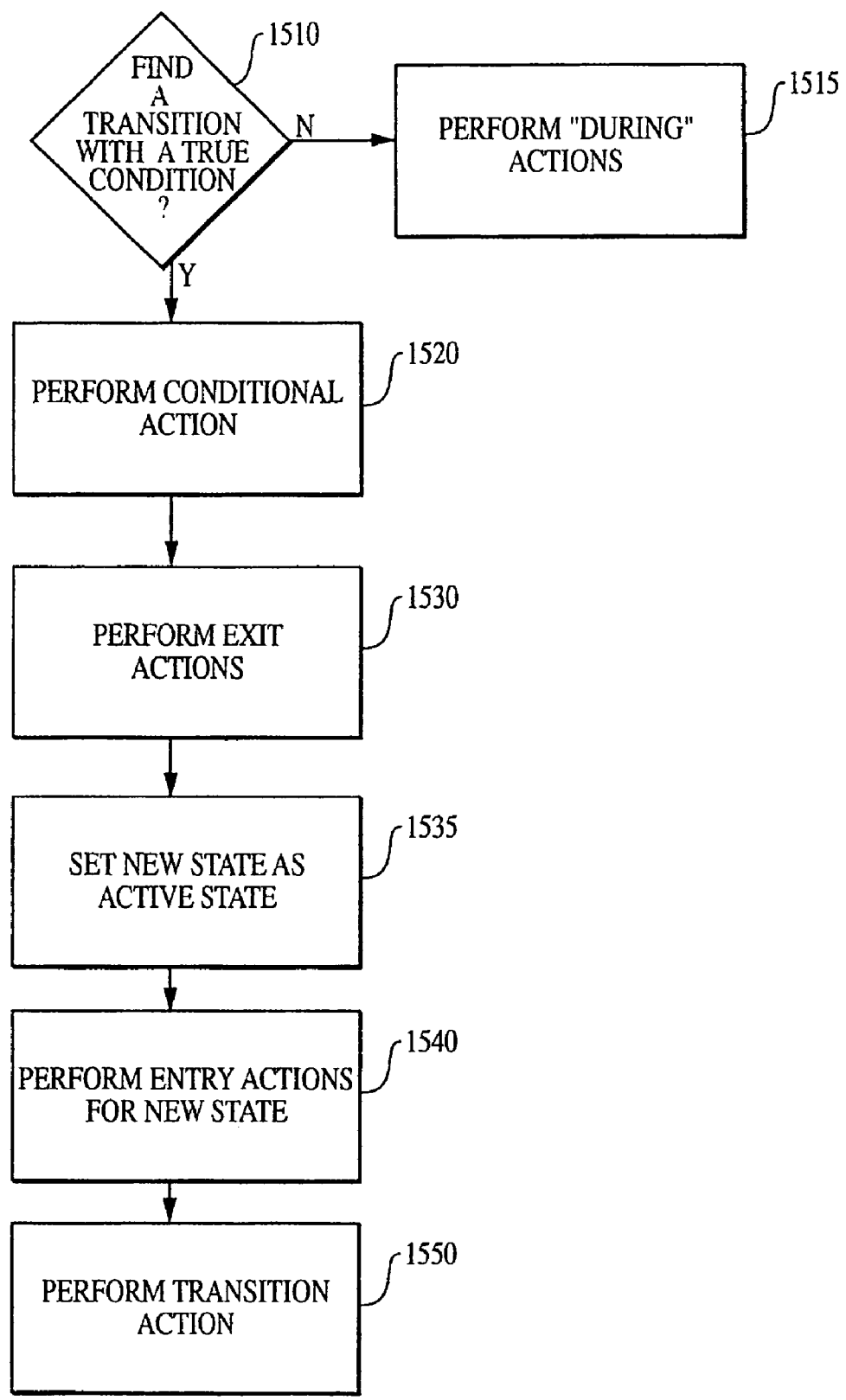

FIG. 15 is a flowchart showing the logic of a generated function for a state. First, the conditions of each transition for which the state is a source are evaluated sequentially until is found to be TRUE (step 1510). If none of the transition conditions are TRUE, then each of the "during" actions in the state is performed (step 1515). If any of the actions is a conditional action, the condition is evaluated and the action is performed only if the condition is TRUE. If one of the transition conditions is found to be TRUE, then the conditional action associated with the transition is performed (step 1520). Then the exit actions for the current state are performed (step 1530). Then the current state is deactivated and the destination state of the transition is made active (step 1535). Then the entry actions for the destination state of the transition are performed (step 1540). Finally, the transition action associated with the transition is performed (step 1550).

Generating code for a temporal logic condition involves inserting a declaration for the counter variables in the global variables section of the generated code and code for initializing, incrementing, and testing the counter variables in the state functions. First, the code generator iterates through the master TLCounter list and generates variable declarations for each TLCounter on the list. Then the code generator iterates through all of the state objects that have been defined in the intermediate representation and generates code for each state. Where a state makes reference to a temporal logic condition, code for that condition is generated as part of the code generated for the state. One of the optimizations performed by the code generator is inlining of state functions. If a state function is simple, the code generator replaces the invocation of the state function with the actual code that implements the state function. This avoids the overhead of a function call.

The generation of code relating to temporal logic conditions will now be described in more detail.

The code generator uses a single structure declaration to declare all the temporal logic counter variables required by a diagram. Each counter variable is declared as a field of this structure. When the code generator generates C code, it uses the C language's bitset declaration to pack the fields contiguously into the structure. For example, suppose that a diagram required two counters, a two-bit-wide counter named i1 and a three-bit wide counter named i3. The code generator would generate the following declaration for these counter variables in the header file of the generated code.

typedef struct SFchartCounterStruct{
   unsigned int i1:2;
   unsigned int i3:3;
}SFchartCounterStruct;

The procedure for generating this declaration is as follows. First the code generator generates the following line at the current location in the generated header file.

typedef struct SFchartCounterStruct{

Then the code generator iterates through each TLCounter structure created by the parser. For each counter variable defined by a TLCounter, it generates the following line in the output file:

unsigned int name:width where "name" is the name of the variable (i1, i2, i3 . . . ) and width is the width in bits of the variable. The code generator gets the name and width of the counter variable from the TLCounter structure. Next, the code generator generates the last line of the declaration as follows:

{SFchartCounterStruct;

Next, the code generator declares an instance of the counters structure as a field of a chart structure type declaration.

typedef struct SFchart_InstanceStruct {
   SFchartCounterStruct Counters;
   SFchartStateStruct State;
} SFchartInstanceStruct;

This chart structure type declares all the global variables used by the diagram. Finally, the code generator generates a line in the C source file that declares an instance of the chart data structure.

static SFchartInstanceStruct chartInstance;

This completes the declaration of the counter variables.

Figure 16:
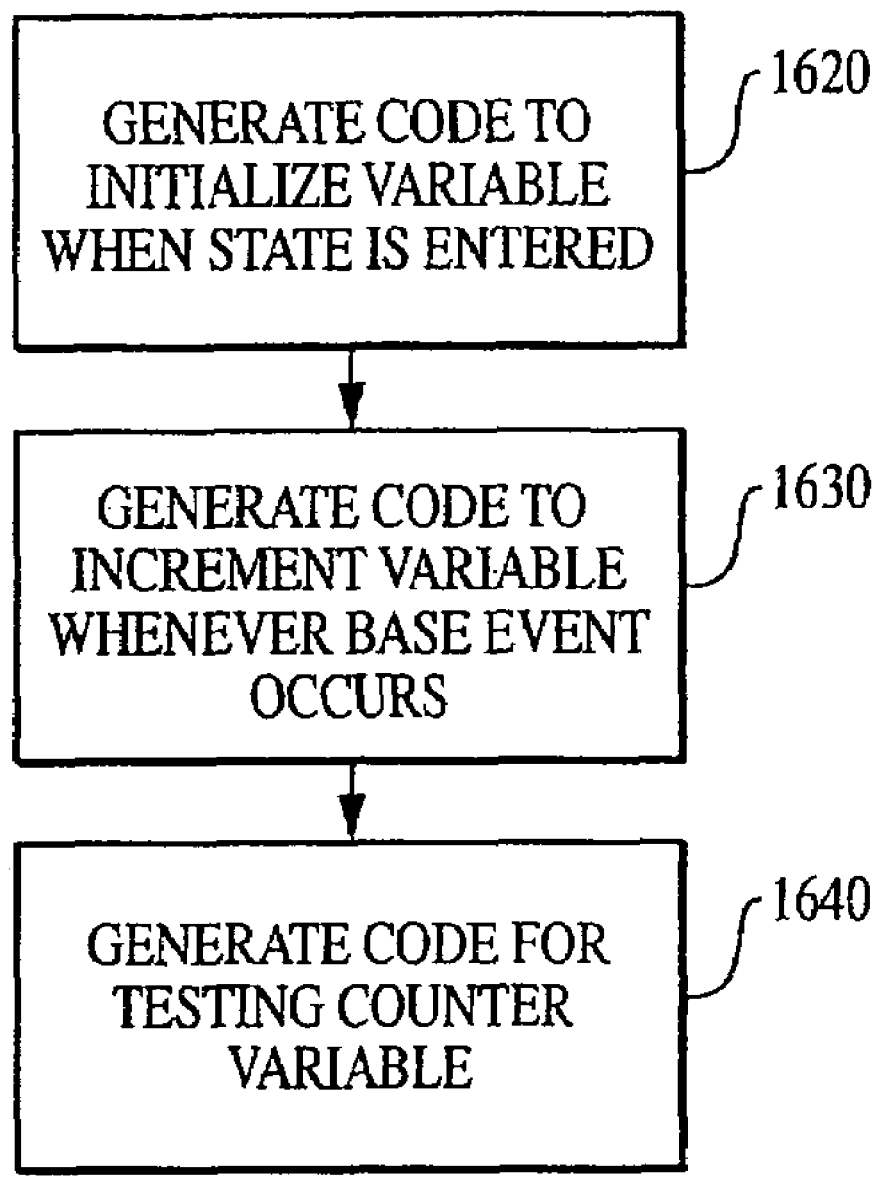

As shown in FIG. 16. the code generator inserts code to initialize a counter variable in the entry action code for the associated state (step 1620). It does this when it is generating the code for the state's user-defined entry actions. The procedure for doing this is as follows. The code generator searches through the TLCondition list built during the parse phase to determine whether any of the conditions are associated with the current state. For each associated condition found in the list, the code generator generates an initialization line in the generated code, e.g., chartInstance.Counters.i=0;

The code generator inserts code to increment counter variables in the chart's global during actions (step 1630). This insures that counter variables will have already been incremented before the conditions associated with a particular state are tested. During generation of the chart's "during action" code, the code generator iterates through the TLCondition list generated by the parser during the parse phase. For each TLCondition in the list, the code generator inserts an if-then statement in the chart function ahead of any calls to the chart's state functions., e.g., /* During: Chart */
   if(_sfEvent_temporal_example_==event_CLK) {
     if(chartInstance.Counters.i1<0xfU) {
       chartInstance.Counters.i1--;
     }
   }

The if-then statement tests whether the current event is the base event of the conditional logic expression's counter and whether the counter is less than its maximum threshold. If both conditions are met, the statement increments the counter.

The code generator inserts counter testing code in the during action of the state associated with the temporal logic condition (step 1640). The code generation of temporal logic counter variable testing code must ensure that the following semantics of state chart behavior is observed. A state's during action code handles determination of transitions from the state. The code tests all conditions on a transition, including temporal logic conditions. If all conditions are satisfied, the during action of the currently active state invokes its own exit action, which then invokes the entry action of the next state. If the conditions on the transition are not satisfied, any user-specified during actions are performed. The user actions may themselves be conditional on temporal logic conditions. To ensure that this behavior is implemented, the code generator must ensure that temporal logic conditions on transitions out of a state are tested before temporal logic conditions on user-defined during actions.

The code generator uses the following procedure to ensure this behavior. When generating code for a state's during action, the code generator first checks the TLCondition list to see whether there are any conditions that occur on transitions leading from this state. All the information needed to make this determination is in the TLCondition list. If there are any temporal logic conditions on transitions leading from this state, the code generator generates counter testing code for those conditions in the state's during action. The testing code consists of an if-then statement where the if statement compares the current value of the counter variable to the threshold for the temporal logic condition. The type of comparison depends on the type of the temporal logic condition. The entry in the TLCondition list for the condition provides both the type of the condition and the threshold value.

After the code generator has generated all transition condition testing code for the state, it next generates code for any during actions specified by the user. If any of the user-specified during actions have temporal logic conditions, the code generator generates the actions as if-then statements where the if clause compares the counter for the TLCondition to the condition's threshold value and the then clause performs the action. This completes generation of code for temporal logic conditions.

Figure 17:
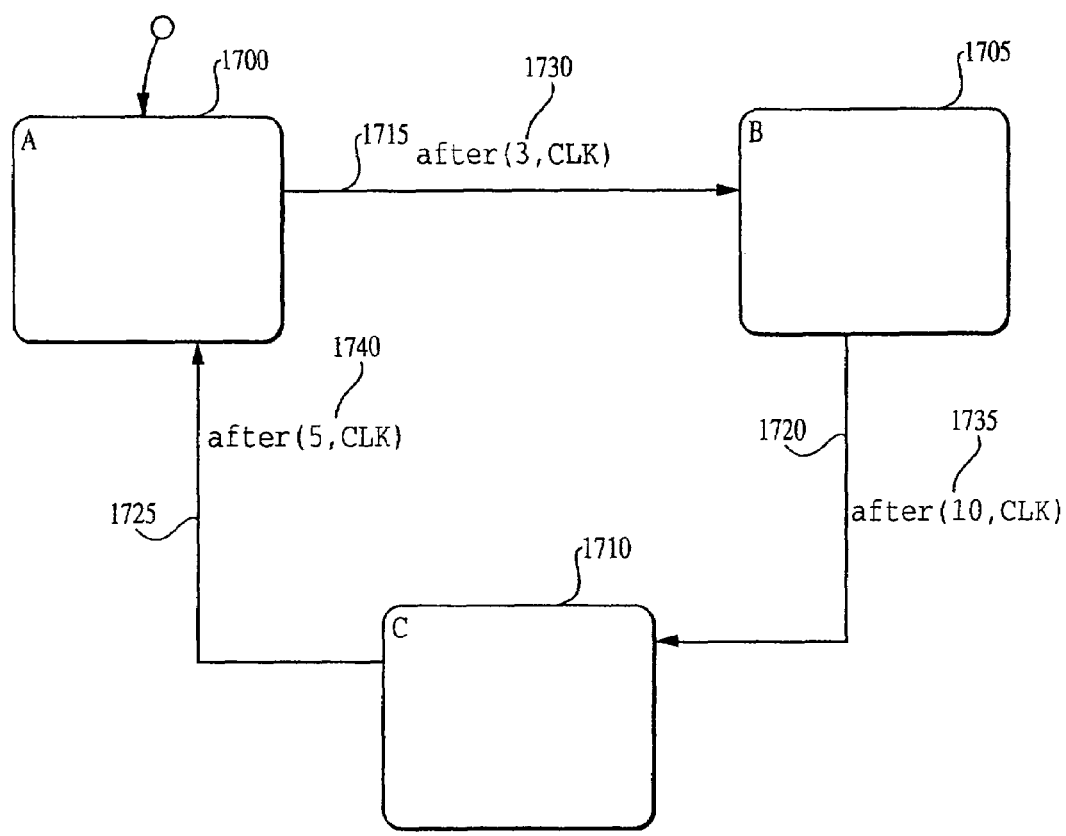
FIG. 17 shows a Stateflow® diagram including temporal logic conditions

We now describe the code generated by an exemplary system of our invention. FIG. 17 shows a Stateflow® diagram having three states A 1700, B 1705 and C 1710, and having three transitions 1715, 1720 and 1725. Temporal logic conditions 1730, 1735 and 1740 associated with each of the transitions employs a temporal logic operator, making the conditions temporal logic conditions.

Figure 19B:
FIG. 19 shows code generated by a code generator.

FIGS. 18 and 19 show C code generated by an exemplary system of our invention in response to the diagram shown in FIG. 17. In FIG. 18, a header file is shown. Because each of the temporal logic operators in FIG. 17 operates on the same base event "CLK" and because their-associated events cannot be active simultaneously, a single folded counter variable may be used in connection with all three temporal logic conditions in which they are found. Thus, FIG. 18 shows a declaration 1800 of a single counter variable "i1". Moreover, because the largest threshold value of any of the temporal logic operators in FIG. 17 is 10, the variable is defined to be 4 bits wide.

In the example of FIG. 17, there is a single recognized event, "CLK" and there is a declaration 1810 of a function for broadcasting occurrences of that event in the header file of FIG. 18. The header files also includes a declaration 1820 of a structure for keeping track of the current state of the chart, a declaration 1830 of a data structure representing the chart, and a declaration 1840 of a chart function for processing event occurrences in relation to the chart.

In FIG. 19, the functional portion of the generated code is shown. A function 1900 for broadcasting the CLK event to the chart is defined. The function sets the current event to be CLK, and calls the chart function 1910. The first code in the chart function is the "chart during" code 1920, which increments the counter variable "i1" if the event is "CLK". This is followed by code 1930 which checks whether the chart has previously been active and, if it hasn't, initializes the chart by setting the active state to be state "A" and resetting the counter variable "i1" to zero. This is followed by code 1940 which, if the chart is already active, directs control to code associated with the particular state of the chart that is currently active.

The code 1950 for state A first tests the condition 1730 of transition 1715, or which state A is a source. This is done in the "during" section of the code. Here, because there are no user-defined "during" actions, this test is the only action performed in the "during" section. The test determines whether the counter variable i1 is greater than or equal to three, corresponding to the temporal logic condition "after(3, CLK)." If the test is true, the transition is effectuated by the remaining code in part 1940 by performing the exit actions for state A (in this case there are none) and then the entry actions for state B, which include setting the global state variable to indicate that state B is active, and resetting the counter i1 to zero.

The code 1960 for state B is similar to the code 1950 for state A, except that it determines whether i1 is greater than or equal to 10, and transitions to state C if this test is TRUE. Similarly, code 1970 for state C tests the counter variable i1 to determine if it is greater than or equal to 5, and if so, transitions back to state A.

Various embodiments have been described of a method and system by which representation of a finite state machine including temporal logic temporal logic conditions may be translated into source code for emulating such a machine. The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable within a computing environment of a computer including at least one programmable processor coupled to receive data and instructions from, and to transmit data and instructions to, a data storage system, at least one input device, and at least one output device.

Figure 20:
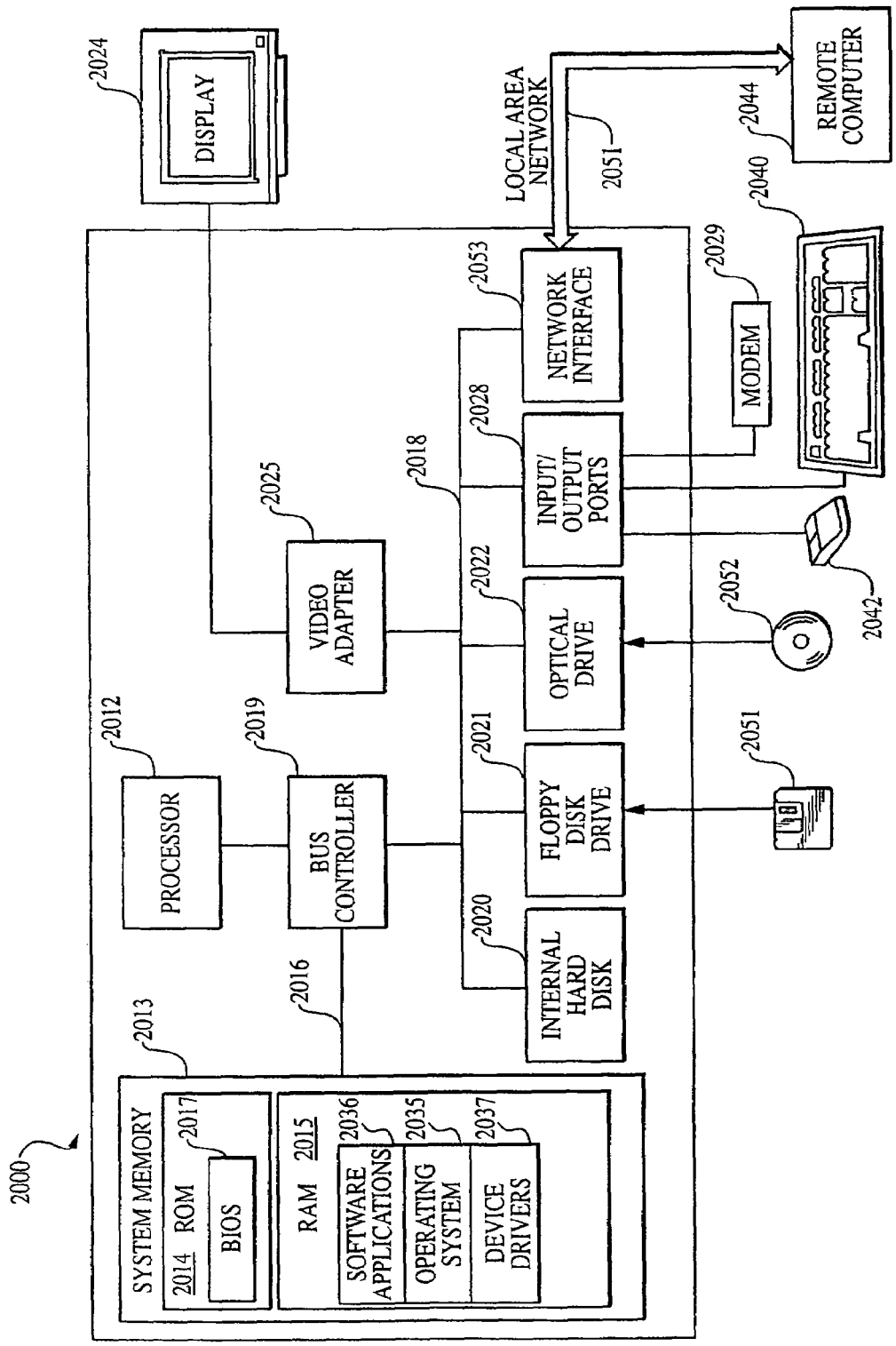
FIG. 20 shows a computer system.

An example of one such type of computer is shown in FIG. 20, which shows a block diagram of a programmable processing system (system) 2000 suitable for implementing or performing the apparatus or methods of the invention. As shown in FIG. 20, the system 2000 includes a processor 2012 that in one implementation belongs to the PENTIU family of microprocessors manufactured by the Intel Corporation of Santa Clara, Calif. However, it should be understood that the invention can be implemented on computers based upon other microprocessors, such as the MIPSR family of microprocessors from the Silicon Graphics Corporation, the POWERPCR family of microprocessors from both the Motorola Corporation and the IBM Corporation, the PRECISION ARCHITECTURER family of microprocessors from the Hewlett-Packard Company, the SPARCR family of microprocessors from the Sun Microsystems Corporation, or the ALPHAR family of microprocessors from the Compaq Computer Corporation. System 2000 represents any server, personal computer, laptop or even a battery-powered, pocket-sized, mobile computer known as a hand-held PC or personal digital assistant (PDA).

System 2000 includes system memory 2013 including read only memory (ROM) 2014 and random access memory (RAM) 2015, which is connected to the processor 2012 by a system data/address bus 2016. ROM 2014 represents any device that is primarily read-only including electrically erasable programmable read-only memory (EEPROM), flash memory, etc. RAM 2015 represents any random access memory such as Synchronous Dynamic Random Access Memory.

Within the system 2000, input/output bus 2018 is connected to the data address bus 2016 via bus controller 2019. In one implementation, input/output bus 2018 is implemented as a standard Peripheral Component Interconnect (PCI) bus.

The bus controller 2019 examines all signals from the processor 2012 to route the signals to the appropriate bus. Signals between the processor 2012 and the system memory 2013 are merely passed through the bus controller 2019. However, signals from the processor 2012 intended for devices other than system memory 2013 are routed onto the input/output bus 2018.

Various devices are connected to the input/output bus 2018 including hard disk drive 2020, floppy drive 2021 that is used to read floppy disk 2051, and optical drive 2022, such as a CD-ROM drive that is used to read an optical disk 2052. The video display 2024 or other kind of display device is connected to the input/output bus 2018 via a video adapter 2025.

Users enter commands and information into the system 2000 by using a keyboard 2040 and/or pointing device, such as a mouse 2042, which are connected to bus 2018 via input/output ports 2028. Other types of pointing devices (not shown in FIG. 11) include track pads, track balls, joysticks, data gloves, head trackers, and other devices suitable for positioning a cursor on the video display 2024.

As shown in FIG. 20, the system 2000 also includes a modem 2029. Although illustrated in FIG. 20 as external to the system 2000, those of ordinary skill in the art will quickly recognize that the modem 2029 may also be internal to the system 2000. The modem 2029 is typically used to communicate over wide area networks (not shown), such as the global Internet. Modem 2029 may be connected to a network using either a wired or wireless connection.

Software applications 2036 and data are typically stored via one of the memory storage devices, which may include the hard disk 2020, floppy disk 2051, CD-ROM 2052 and are copied to RAM 2015 for execution. In one implementation, however, software applications 2036 are stored in ROM 2014 and are copied to RAM 2015 for execution or are executed directly from ROM 2014.

In general, the operating system 2035 executes software applications 2036 and carries out instructions issued by the user. For example, when the user wants to load a software application 2036, the operating system 2035 interprets the instruction and causes the processor 2012 to load software application 2036 into RAM 2015 from either the hard disk 2020 or the optical disk 2052. Once one of the software applications 2036 is loaded into the RAM 2015, it can be used by the processor 2012. In case of large software applications 2036, processor 2012 loads various portions of program modules into RAM 2015 as needed.

The Basic Input/Output System (BIOS) 2017 for the system 2000 is stored in ROM 2014 and is loaded into RAM 2015 upon booting. Those skilled in the art will recognize that the BIOS 2017 is a set of basic executable routines that have conventionally helped to transfer information between the computing resources within the system 2000. Operating system 2035 or other software applications 2036 use these low-level service routines. In one implementation system 2000 includes a registry (not shown) that is a system database that holds configuration information for system 2000. For example, the Windows® operating system by Microsoft Corporation of Redmond, Wash., maintains the registry in two hidden files, called USER.DAT and SYSTEM.DAT, located on a permanent storage device such as an internal disk.

A number of embodiments of the invention have been described. Nevertheless, it will be understood by those of skill in the art that various modifications may be made without departing from the spirit and scope of the invention. For example, although an embodiment of the invention as an extension of the Stateflow® programming environment has been described, the invention may be implemented in any system for emulating finite state machines described using statechart-like notations. In addition, the invention may be applied equally well to systems that emulate finite state machines models that are described in a non-graphical (e.g., textual) format. Furthermore, other types of temporal logic operators, not explicitly discussed herein, are also within the scope of the invention. For example, although the temporal logic operators described above each operate on only one event, other operators could be defined operating on two or more events. Thus, for example, an operator could be defined in terms of a first and a second event, where the operator would be true when the first event had occurred more times than the second event, since the relevant state became active.

In addition, while the embodiment describe above is of a code generator for generating source code for emulating a finite state machine model, the invention encompasses other means emulating a finite state machine model including temporal logic conditions, for example a system for directly interpreting (without first compiling) a graphical representation of such a model would be within the scope of the invention.

Accordingly, other embodiments are within the scope of the following claims.

We claim:

1. A computer-implemented method for modeling a system using a finite state machine, said method comprising:
   modeling a system using a finite state machine representation;
   associating an event-driven temporal logic operator with a first state in the finite state machine representation, the first state being an active state, a value of the temporal logic operator being determined by a number of occurrences of an event during a current activation of the first state associated with the temporal logic operator;
   executing a state transition from the first state to a second state based on the value of the temporal logic operator; and
   setting the second state as the active state.

2. The method of claim 1 further comprising:
   providing a graphical representation of the system.

3. The method of claim 2, further comprising:
   generating code for the graphical representation of the system.

4. The method of claim 3 wherein the generated code is in a human readable programming language.

5. The method of claim 2 wherein the graphical representation of the system comprises a statechart diagram.

6. The method of claim 1, further comprising:
   generating a counter based on the temporal logic operator.

7. The method of claim 6, further comprising:
   associating one or more events with the counter; and
   updating the counter upon occurrence of at least one of the one or more associated events.

8. The method of claim 6, wherein executing a state transition based on the value of the temporal logic operator further comprises executing the state transition when the counter reaches a predetermined value.

9. The method of claim 6, further comprising:
   resetting the counter upon the state transition.

10. A storage medium holding computer-executable instructions that, when executed on a computer, model a system using a finite state machine, the instructions comprising:
    instructions for modeling a system using a finite state machine representation;
    instructions for associating an event-driven temporal logic operator with a first state in the finite state machine representation, the first state being an active state, a value of the temporal logic operator being determined by a number of occurrences of an event during a current activation of the first state associated with the temporal logic operator;

instructions for executing a state transition from the first state to a second state based on the value of the temporal logic operator; and instructions for setting the second state as the active state.

11. The medium of claim 10 wherein the instructions further comprise:

instructions for providing a graphical representation of the system.

12. The medium of claim 11 wherein the instructions further comprise:

instructions for generating code for the graphical representation.

13. The medium of claim 12 wherein the generated code is in a human readable programming language.

14. The medium of claim 10 wherein the instructions further comprise:

instructions for generating a counter based on the temporal logic operator.

15. The medium of claim 14 wherein the instructions further comprise:

instructions for associating one or more events with the counter; and instructions for updating the counter upon occurrence of at least one of the one or more associated events.

16. The medium of claim 14 wherein executing a state transition based on the value of the temporal logic operator further comprises executing the state transition when the counter reaches a predetermined value.

17. The medium of claim 14, wherein the instructions further comprise:

instructions for resetting the counter upon the state transition.

18. An apparatus comprising:

means for modeling a system using a finite state machine representation;

means for associating an event-driven temporal logic operator with a first state in the finite state machine representation, the first state being an active state, a value of the temporal logic operator being determined by a number of occurrences of an event during a current activation of the first state associated with the temporal logic operator;

means for executing a state transition from the first state to a second state based on the value of the temporal logic operator; and means for setting the second state as the active state.

19. A system for modeling using a finite state machine, comprising:

a finite state machine representation used in modeling a system;

an event-driven temporal logic operator associated with a first state in the finite state machine representation, the first state being an active state, a value of the temporal logic operator being determined by a number of occurrences of an event during a current activation of the first state associated with the temporal logic operator; and a processor configured to:

enable a state transition from the first state to a second state executed based on the value of the temporal logic operator, and set the second state as the active state.

* * * * *

UNITED STATES PATENT AND TRADEMARK OFFICE
CERTIFICATE OF CORRECTION

PATENT NO. : 7,433,808 B1  Page 1 of 1
APPLICATION NO. : 11/329588
DATED : October 7, 2008
INVENTOR(S) : Vijaya Raghavan et al.

It is certified that error appears in the above-identified patent and that said Letters Patent is hereby corrected as shown below:

On the cover page, in the Inventors item (75), line 1, change "Vijay" to --Vijaya--.

Column 12, line 40, change "PENTIU" to --PENTIUM®--.

Signed and Sealed this

Twenty-seventh Day of January, 2009

JOHN DOLL
*Acting Director of the United States Patent and Trademark Office*